US012325267B2

(12) United States Patent
Moline et al.

(10) Patent No.: US 12,325,267 B2
(45) Date of Patent: Jun. 10, 2025

(54) WHEEL COMPRISING AN INTERNAL INFLATION CHANNEL, LANDING GEAR AND AN AIRCRAFT COMPRISING SUCH A WHEEL

(71) Applicant: SAFRAN LANDING SYSTEMS, Velizy Villacoublay (FR)

(72) Inventors: Sylvain Moline, Moissy-Cramayel (FR); Yannick Tarnowski, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 406 days.

(21) Appl. No.: 17/783,702

(22) PCT Filed: Dec. 10, 2020

(86) PCT No.: PCT/EP2020/085461
§ 371 (c)(1),
(2) Date: Jun. 9, 2022

(87) PCT Pub. No.: WO2021/116261
PCT Pub. Date: Jun. 7, 2021

(65) Prior Publication Data
US 2022/0388356 A1     Dec. 8, 2022

(30) Foreign Application Priority Data
Dec. 10, 2019   (FR) ..................................... 1914078

(51) Int. Cl.
*B60C 29/02*     (2006.01)
*B60B 21/02*     (2006.01)
(Continued)

(52) U.S. Cl.
CPC ............ *B60C 29/02* (2013.01); *B60B 21/023* (2013.01); *B60B 25/002* (2013.01); *B64C 25/36* (2013.01)

(58) Field of Classification Search
CPC ....... B60C 29/02; B64C 25/36; B60B 25/002; B60B 25/004; B60B 25/006; B60B 25/14; B60B 21/02; B60B 21/023; B60B 21/04
See application file for complete search history.

(56) References Cited

U.S. PATENT DOCUMENTS 1,645,921 A  * 10/1927 Moore ................... B60C 29/02
                                                152/384
2,544,387 A  *  3/1951 Kerr ......................... B60B 3/12
                                                301/64.203
(Continued)

FOREIGN PATENT DOCUMENTS

CN      201446845 U      5/2010
DE      41 03 644 A1     4/1992
(Continued)

OTHER PUBLICATIONS

International Search Report for PCT/EP2020/085461 dated, Mar. 15, 2021 (PCT/ISA/210).

*Primary Examiner* — Kip T Kotter
(74) *Attorney, Agent, or Firm* — Sughrue Mion, PLLC

(57) ABSTRACT

A vehicle wheel includes a rim having mounted thereon an inflation valve and a tire. The inflation valve is extended by an inflation channel extending through the rim and opening out into a volume of gas defined by the rim and the tire. The inflation valve is arranged in the vicinity of a flange of the rim.

12 Claims, 3 Drawing Sheets

(51) Int. Cl.
    *B60B 25/00*      (2006.01)
    *B64C 25/36*      (2006.01)

(56) References Cited

U.S. PATENT DOCUMENTS

| | | | | |
|---|---|---|---|---|
| 2,871,905 | A * | 2/1959 | Stanton | B60C 29/02 |
| | | | | 301/6.2 |
| 2,988,126 | A * | 6/1961 | Wells | B60B 3/02 |
| | | | | 152/429 |
| 3,362,452 | A * | 1/1968 | Harnish | B60C 23/00363 |
| | | | | 152/416 |
| 3,396,774 | A * | 8/1968 | Edwards | B60C 29/06 |
| | | | | 152/427 |
| 4,106,543 | A * | 8/1978 | Sano | B60B 25/22 |
| | | | | 152/405 |
| 4,369,826 | A * | 1/1983 | Hendrickson | B60C 29/02 |
| | | | | 152/410 |
| 7,971,614 | B2 * | 7/2011 | Durif | B60B 25/14 |
| | | | | 152/410 |
| 2010/0207445 | A1 * | 8/2010 | Medley | B60B 25/12 |
| | | | | 251/12 |
| 2011/0221261 | A1 | 9/2011 | Eaton et al. | |
| 2017/0274989 | A1 * | 9/2017 | Zeisler | B64C 25/36 |

FOREIGN PATENT DOCUMENTS

| | | | |
|---|---|---|---|
| DE | 44 45 267 A1 | | 6/1996 |
| DE | 103 43 598 A1 | | 4/2005 |
| GB | 572225 A | * | 9/1945 |
| GB | 706143 A | * | 3/1954 |
| GB | 738847 A | * | 10/1955 |
| GB | 892331 A | | 3/1962 |

* cited by examiner

WHEEL COMPRISING AN INTERNAL INFLATION CHANNEL, LANDING GEAR AND AN AIRCRAFT COMPRISING SUCH A WHEEL

CROSS REFERENCE TO RELATED APPLICATIONS

This application is a National Stage of International Application No. PCT/EP2020/085461 filed Dec. 10, 2020, claiming priority based on French Patent Application No. 1914078 filed Dec. 10, 2019, the contents of each of which are herein incorporated by reference in their entireties.

The present invention relates to a wheel including a rim in which an inflation and/or leakage channel is organized. The wheel is for fitting to a vehicle such as an aircraft.

BACKGROUND OF THE INVENTION

A wheel generally comprises a central hub defining an axis of rotation for the wheel and a rim that is coaxial about the central hub and that is connected to the central hub by a web. The rim is provided with annular flanges projecting towards the outside of the wheel for receiving between them a tire that co-operates with the rim to define a volume for receiving an inflation gas.

Aircraft wheels are known in which the rim generally comprises an inner half-rim and an outer half-rim having respective webs that are assembled together by means of angularly distributed bolts. The inner half-rim usually includes a groove for receiving a sealing gasket that is compressed between the two half-rooms in order to seal the volume defined by the rim and the tire.

An aircraft wheel is also provided with an inflation valve in communication with the volume defined by the rim and the tire so as to enable the pressure of the tire inflation gas to be checked and adjusted. The valve is generally secured to the outer half-rim, i.e. on the free side of the wheel, so as to facilitate inflation operations. More precisely, the valve projects axially from the web of the outer half-rim into the volume defined by the annular portion of the rim that protects said valve from impacts and from the air stream generated by taxiing.

In the field of aviation, provision is now being made to fit aircraft with members for driving wheels in rotation so as to enable the aircraft to move on the ground without using its own aero engines, in particular in order to reduce its environmental footprint. It is found to be technically difficult to fit a wheel with a motor when the wheel is already fitted with a brake, specifically because of the lack of available space and because of the need to cool the brake after braking. In particular, the inner half-rim of the wheel is already pretty much filled with brake disks and there remains very little room for installing a motor and its coupling device in the space available in the immediate proximity of the wheel.

Also, proposals have been made to install the drive members in the outer half-rim. Nevertheless, the presence of the inflation valve in the web makes any such installation much more complicated, since it is essential to leave access to said valve for the purposes of inflating and checking the pressure of the tire.

OBJECT OF THE INVENTION

An object of the invention is thus to propose an aircraft wheel enabling the above-mentioned problems to be obviated at least in part.

SUMMARY OF THE INVENTION

To this end, the invention provides a vehicle wheel comprising a rim centered on an axis of rotation of the wheel and having mounted thereon a tire and an inflation valve for the tire. The tire is engaged between flanges secured to the rim so as to co-operate with the rim and to define a volume connected to the outside by an inflation channel.

According to the invention, the inflation channel extends in the rim, having a first end opening out into the volume and a second end opening to the outside of the volume in the vicinity of one of the flanges and being provided with the inflation valve.

Thus, the valve is offset to the vicinity of the junction between the flange and the rim, thereby releasing the volume defined by the rim opposite from the tire.

According to a particular characteristic of the invention, the channel extends substantially parallel to the axis of rotation of the wheel.

In particular manner, the rim includes a boss of substantially rectilinear shape extending axially from a web secured to the rim towards the flange of the rim that has the inflation valve extending in its vicinity, the inflation channel extending at least in part inside the boss.

In particular manner, the boss includes a reception surface for receiving the inflation valve, the reception surface running on from the flange that has the inflation valve extending in its vicinity.

In particular manner, the inflation valve is outwardly inclined relative to the axis of rotation of the wheel.

According to another particular characteristic, the rim comprises two half-rims, each comprising a respective annular rim portion, a respective web, and a respective half-hub arranged to be rotatably received on an axle.

In particular manner, the inflation channel extends through only one of the two half-rims.

According to another particular characteristic, a protective ring is fastened coaxially to the rim via fastener means (13, 25), the protective ring being arranged in such a manner that the inflation valve extends inside a volume defined by the rim and by said ring.

In particular manner, the fastener means comprise lugs projecting axially from a periphery of the rim, the protective ring being bolted to the lugs.

In particular manner, the protective ring comprises a plurality of portions that are generally circularly arcuate in shape.

In particular manner, the protective ring leaves empty space around the inflation valve.

The invention also provides aircraft landing gear including such a wheel

The invention also provides an aircraft including such landing gear.

BRIEF DESCRIPTION OF THE DRAWINGS

The invention can be better understood in the light of the following description, which is purely illustrative and non-limiting, and which should be read with reference to the accompanying drawings, in which.

DETAILED DESCRIPTION OF THE INVENTION

Below, the wheel is described in application to an aircraft wheel for fitting to the bottom end of an undercarriage of aircraft landing gear.

Figure 1:
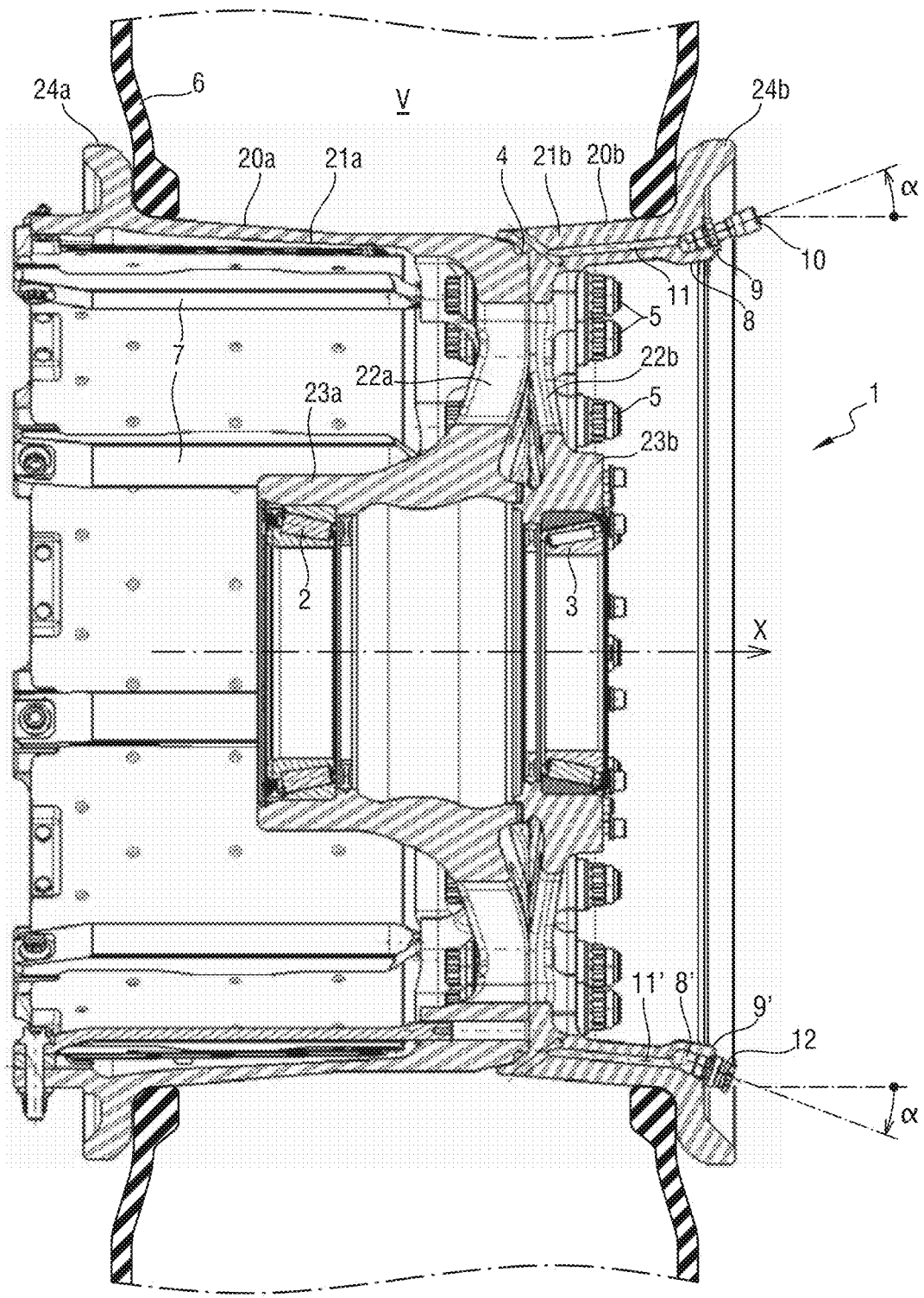
FIG. 1 is an axial section view of a braked aircraft wheel in a particular embodiment of the invention.

With reference to FIG. 1, and in a particular embodiment of the invention, an aircraft wheel 1 comprises two half-wheels 20a and 20b, each having a respective annular rim 21a, 21b connected by a respective web 22a, 22b to a respective half-hub 23a, 23b rotatably received on an axle by means of a respective bearing 2, 3. The half-wheel 20a includes a groove formed in an edge of the rim 21a and having a sealing gasket 4 arranged therein so that it becomes elastically compressed between the two half-wheels 20a and 20b once they are assembled together.

The half-wheels 20a and 20b are moved towards each other in a direction parallel to the axis of rotation X of the wheel 1 and they include centering surfaces to ensure that the two half-wheels 20a and 20b are properly positioned relative to each other. The half-wheels 20a and 20b are held in position by assembly bolts 5 arranged in facing orifices formed in the webs 22a and 22b.

In known manner, the bolts 5 are assembled and tightened in order to assemble together the half-wheels 20a and 20b after a tire 6 has been mounted on the rims 21a and 21b. In this position, the sealing gasket 4 is elastically compressed between the half-wheels 20a and 20b, thereby preventing the gas contained in a volume V defined by the tire 6 and by the half-wheels 20a and 20b from escaping to the outside of the wheel 1.

Each of the half-wheels 20a and 20b has a respective annular flange 24a, 24b arranged at a distal end of the rim 21a, 21b and projecting radially outwards from the wheel 1. The rim flanges 24a and 24b form radial abutments that prevent the tire 6 from coming off the rim.

The rim 21a has an inside surface facing an outside surface of the half-hub 23a and cooperating therewith and with the web 22a to define a space for receiving a stack of brake disks (not shown). The stack comprises both stator disks that do not rotate relative to the axle and also rotor disks that have peripheral notches (given general reference 7) for receiving bars that are secured to the inside surface of the rim 21a. Each bar 7 extends along an axis parallel to the axis of rotation X of the wheel 1.

Figure 2:
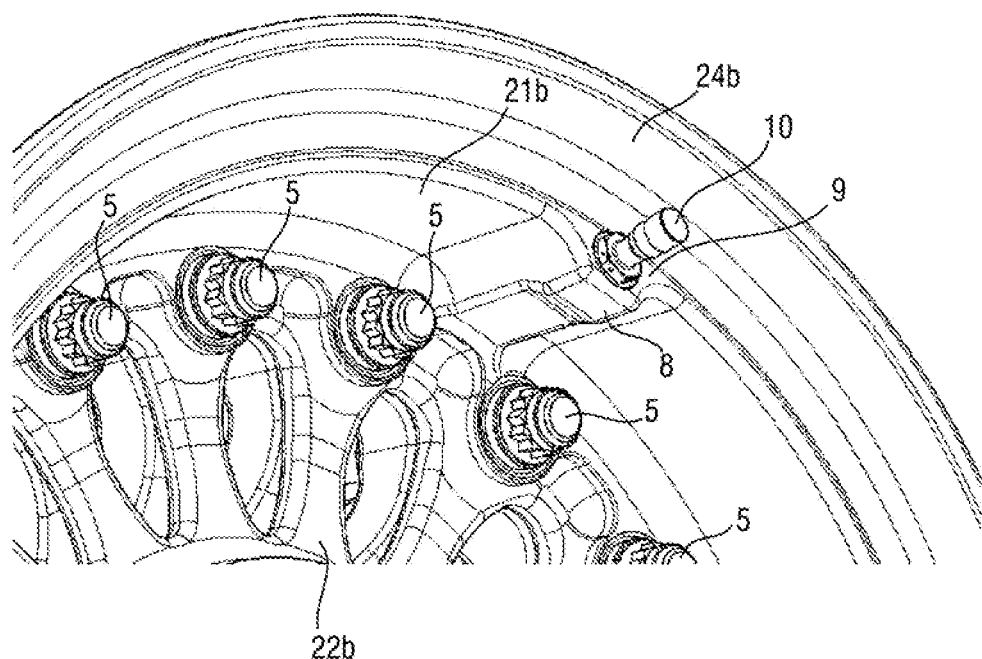
FIG. 2 is a perspective view of a portion of the aircraft wheel shown in FIG. 1, showing the arrangement of the inflation valve.

As shown in FIG. 2, the rim 21b has an inside surface provided with a first boss 8 of substantially rectilinear shape that extends axially from the web 22b towards the distal end of said rim the 21b, where the boss terminates by a surface 9 running on from the flange 24b.

An inflation channel 11 extends inside the boss 8, lying in a plane that contains the axis of rotation X of the wheel 1 and that divides said boss 8 into two equal portions, which channel opens out into the volume V at a proximal end of the rim 21b, in the vicinity of the web 22b. In this example, the channel 11 is in the form of two drill holes opening out into each other, one being made from the outside surface of the rim 21b so as to form a first end of the channel 11 that opens out into the volume V, and the other being made from the surface 9 of the boss 8 so as to form a second end of the channel 11.

The second end of the channel 11 includes a bore in which there is fastened an inflation valve 10 that projects from the surface 9 of the boss 8. The valve 10 enables gas under pressure to be injected into the volume V defined by the tire 6 and by the rims 21a and 21b.

Arranging the valve 10 in this way on the outside of the half-wheel 20b, and in particular in the proximity of the rim flange 24b, allows drive members for the wheel 1 to be installed inside the half-wheel 20b, while still ensuring that an operator can access the valve 10.

In similar manner, the rim portion 21b includes a second boss 8' that is substantially identical to the first boss 8 and that is located in a position diametrically opposite the position of the first boss 8. The boss 8' is thus rectilinear in shape and it extends axially from the web 22b towards the distal end of said rim portion 21b so as to form a second surface 9' that runs on locally from the rim flange 24b.

The surface 9' includes a bore having a pressure relief valve 12 fastened therein. The bore is extended by a channel 11' that is identical to the channel 11 so as to allow the gas under pressure contained in the volume V to escape. In identical manner to the channel 11, the channel 11' extends through the boss 8', lying in a plane that contains the axis of rotation X of the wheel 1 and that divides said boss 8' into two equal portions, which channel opens out into the volume V at a proximal end of the rim 21b, in the vicinity of the rim 21b. The channel 11' is made by drilling two holes that open out into each other, one being made from the outside surface of the rim 21b and the other from the surface 9' from which the pressure relief valve 12 projects.

In order to balance the wheel 1, the bosses 8 and 8' are distributed symmetrically about the axis of rotation X of the wheel 1. Thus, both channels 11 and 11' extend in the same plane containing the axis of rotation X, which is the plane of FIG. 1.

It should be observed that the inflation valve 10 and the pressure relief valve 12 form a nonzero angle $\alpha$ with the axis of rotation X of the wheel 1. In this example, the angle $\alpha$ is equal to about 30° and it serves to facilitate operator access to the inflation valve 10 and to the pressure relief valve 12, in particular when drive members are present.

Figure 3:
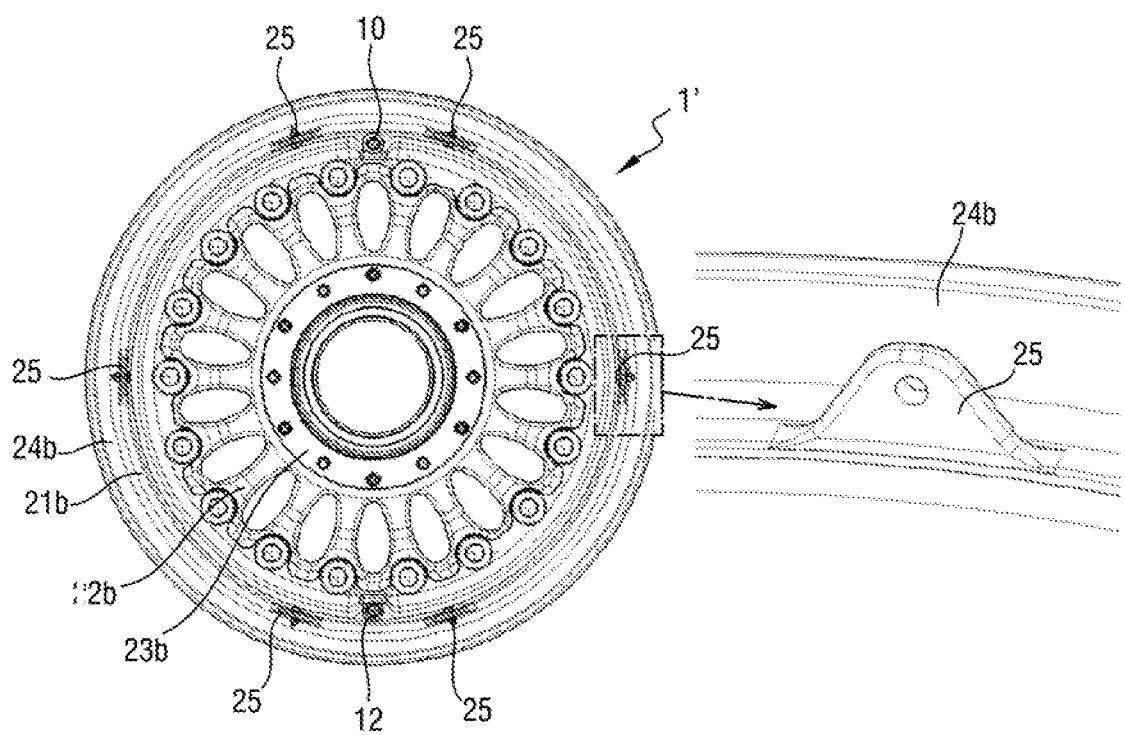
FIG. 3 is a face view of a variant of the aircraft wheel shown in FIG. 1, showing the arrangement of means for fastening a protective ring.
Figure 4:
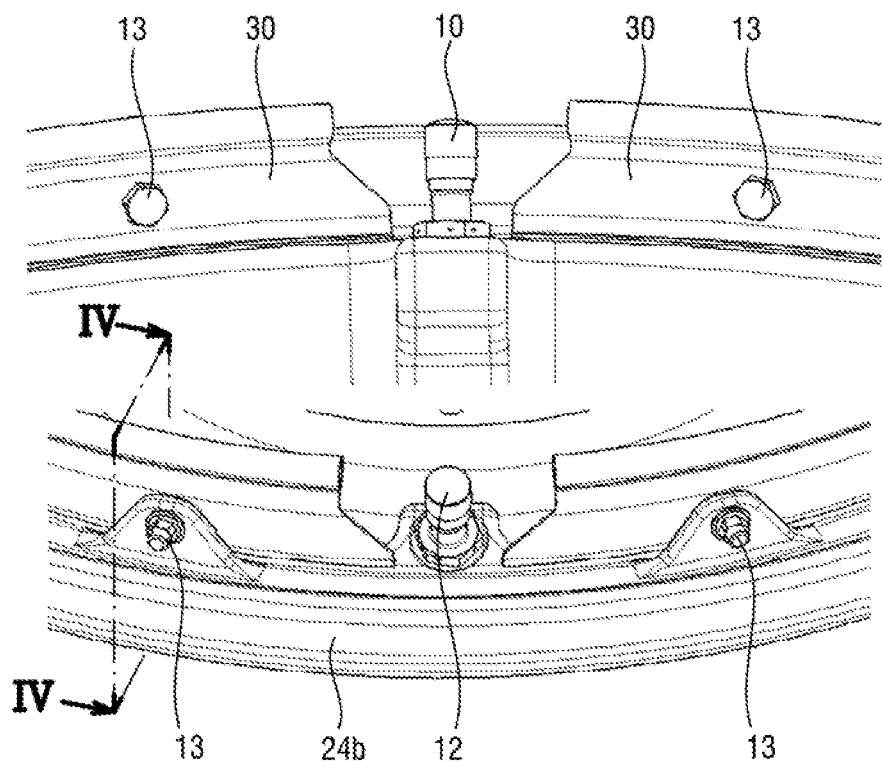
FIG. 4 is a perspective view of a portion of the aircraft wheel shown in FIG. 3, showing the shape of the protective ring in the vicinity of the inflation valve.

FIGS. 3 and 4 show an aircraft wheel 1' that is merely a variant of the aircraft wheel 1 shown in FIG. 1.

The wheel 1' differs from the wheel 1 in that it includes a protective ring 30 made of metal and extending coaxially around the axis of the half-wheels 20a and 20b in order to protect the inflation valve 10 and the pressure relief valve 12. The protective ring 30 comprises two substantially identical pieces of generally semicircular shape, extending on either side of the inflation valve 10 and the pressure relief valve 12.

Figure 5:
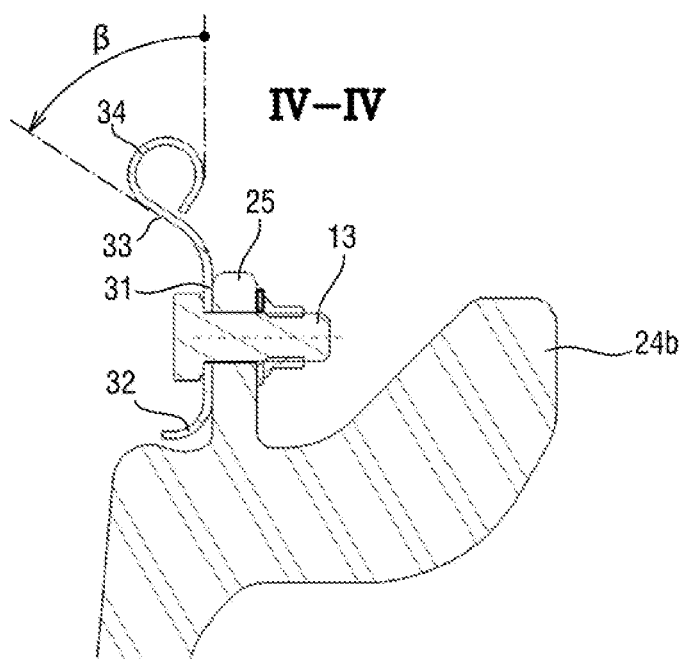
FIG. 5 is an axial section view on plane IV-IV of a portion of the aircraft wheel, showing the profile of the protective ring.

As shown in FIG. 5, each of the pieces of the protective ring 30 itself comprises a semi-tubular portion 31 extended on one side by an inwardly curved portion 32, and on the other side by a semi-frustoconical portion 33 that terminates in a bead 34.

At its ends and in its middle, the semi-tubular portion 31 has respective orifices enabling it to be fastened by means of bolts 13 to lugs 25 projecting axially from the flange 24b of the half-rim 20b. There are thus six lugs 25, four of which are arranged beside the inflation valve 10 or beside the pressure relief valve 12, and the other two of which serve to limit deflection of the protective ring 30.

The curved portion 32 is arranged so as to be as close as possible to the half-rim 20b without touching it so as to limit disturbances to the stream of air and so as to avoid damaging said half-rim 20b while taxiing.

The semi-frustoconical portion 33 extends towards the inside of the wheel 1' and forms an angle β relative to the axis of rotation X, which angle is substantially close to 60° in this example. By way of example, the length of the semi-frustoconical portion 33 may depend on the volume of air that it is desired to allow to pass between the wheel 1' and the drive members of said wheel 1'.

The protective ring 30 thus serves both to protect the inflation valve 10 and the pressure relief valve 12 from external attack and also to control the stream of air, thereby limiting the disturbances to the stream of air that are created during taxiing.

In this example, the bead 34 is rounded in shape, thereby serving firstly to stiffen the ring 30 and secondly to avoid damaging nearby parts or injuring an operator.

Each of the ends of the portions of the ring 30 is chamfered so as to leave empty space around the inflation valve 10 and the pressure relief valve 12 thereby facilitating access to the valves.

As a result of being fastened by means of bolts 13, the protective ring 30 is easily removable. It can therefore be replaced rapidly by another protective ring of a different shape, e.g. in order to adjust the stream of air, or indeed to accommodate valves of different dimensions.

Naturally, the invention is not limited to the embodiments described, but covers any variant coming within the ambit of the invention as defined by the claims.

The wheel may be made up of one or more parts.

The number of bosses may be equal to one or greater than two.

The angle of inclination α of the inflation valve 10 and/or of the pressure relief valve 12 may be less than or greater than 30°, or indeed zero.

Although the protective ring in this example is made of metal, it is possible to envisage using other materials (plastics, . . . ).

The shape and the dimensions of the protective ring may be different.

The protective ring may be made as a single piece or as a plurality of pieces.

The number of lugs for fastening the protective ring to the half-rim may be different.

It is possible to envisage using other means for fastening the protective ring to the half-rim (clipping, screw-fastening, . . . ).

The angle of inclination β formed by the frustoconical portion of the protective ring and the axis of rotation X of the wheel 1' may be less than or greater than 60°, or even zero.

The wheel of the invention is described above in application to aircraft landing gear. Naturally, it can be used with other types of vehicle, and for example with land vehicles.

The invention claimed is:

1. A vehicle wheel comprising a rim centered on an axis of rotation of the wheel and having mounted thereon a tire and an inflation valve for the tire, the tire being engaged between flanges secured to the rim so as to co-operate with the rim to define a volume connected to the outside by an inflation channel that extends in the rim and that is made in said rim, having a first end opening out into the volume and a second end opening to the outside of the volume in the vicinity of one of the flanges and that is provided with the inflation valve, wherein the rim includes a boss of substantially rectilinear shape extending axially from a web secured to the rim towards the flange of the rim that has the inflation valve extending in its vicinity, the inflation channel extending at least in part inside the boss.

2. The vehicle wheel according to claim 1, wherein the channel extends substantially parallel to the axis of rotation of the wheel.

3. The vehicle wheel according to claim 1, wherein the boss includes a reception surface for receiving the inflation valve, the reception surface running on from the flange that has the inflation valve extending in its vicinity.

4. The vehicle wheel according to claim 1, wherein the inflation valve is outwardly inclined relative to the axis of rotation of the vehicle wheel.

5. The vehicle wheel according to claim 1, wherein the rim comprises two half-rims, each comprising a respective annular rim portion, a respective web, and a respective half-hub arranged to be rotatably received on an axle.

6. The vehicle wheel according to claim 5, wherein the inflation channel extends through only one of the two half-rims.

7. The vehicle wheel according to claim 1, including a protective ring fastened coaxially to the rim via fastener means, the protective ring being arranged in such a manner that the inflation valve extends inside a volume defined by the rim and by said ring.

8. The vehicle wheel according to claim 7, wherein the fastener means comprise lugs projecting axially from the periphery of the rim, the protective ring being bolted to the lugs.

9. The vehicle wheel according to claim 7, wherein the protective ring comprises a plurality of pieces that are generally circularly arcuate in shape.

10. The vehicle wheel according to claim 7, wherein the protective ring leaves empty space around the inflation valve.

11. An aircraft landing gear including at least one of the vehicle wheel according to claim 1.

12. An aircraft including the aircraft landing gear according to claim 11.

* * * * *